(12) United States Patent
Hirai

(10) Patent No.: US 11,999,215 B2
(45) Date of Patent: Jun. 4, 2024

(54) REAR SUSPENSION STRUCTURE

(71) Applicant: HONDA MOTOR CO., LTD., Tokyo (JP)

(72) Inventor: Hideki Hirai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/169,992

(22) Filed: Feb. 16, 2023

(65) Prior Publication Data

US 2023/0302861 A1 Sep. 28, 2023

(30) Foreign Application Priority Data

Mar. 24, 2022 (JP) ................................. 2022-047940

(51) Int. Cl.
*B60G 7/02* (2006.01)
*B60G 7/00* (2006.01)
*B60G 11/14* (2006.01)

(52) U.S. Cl.
CPC ............ *B60G 7/001* (2013.01); *B60G 7/008* (2013.01); *B60G 7/02* (2013.01); *B60G 11/14* (2013.01); *B60G 2200/154* (2013.01); *B60G 2204/143* (2013.01); *B60G 2204/148* (2013.01)

(58) Field of Classification Search
CPC .......... B60G 7/001; B60G 7/008; B60G 7/02; B60G 11/14; B60G 2200/154; B60G 2204/143; B60G 2204/148; B60G 21/05; B60G 21/051; B60G 21/052; B60G 2200/21; B60G 2200/22
See application file for complete search history.

(56) References Cited

U.S. PATENT DOCUMENTS

| 2003/0111819 | A1* | 6/2003 | Bae ....................... | F16F 1/3873 |
| | | | | 280/124.177 |
| 2007/0290474 | A1* | 12/2007 | Inoue ................... | B60G 21/051 |
| | | | | 280/124.166 |
| 2012/0013095 | A1* | 1/2012 | Gerrard ................. | B60G 7/008 |
| | | | | 280/124.134 |
| 2015/0231939 | A1* | 8/2015 | Yamamotoya ........... | B60G 3/14 |
| | | | | 267/288 |
| 2021/0008949 | A1* | 1/2021 | Takahashi .............. | B60G 7/001 |

FOREIGN PATENT DOCUMENTS

| JP | 6218025 B2 | 10/2017 | | |
| KR | 20210014392 A | * 2/2021 | ........... | B60G 21/052 |

OTHER PUBLICATIONS

Park Woo Young, Feb. 2021, KR-20210014392-A, Machine Translation of Specification.*

* cited by examiner

*Primary Examiner* — Amy R Weisberg
*Assistant Examiner* — Matthew Joseph Ganci
(74) *Attorney, Agent, or Firm* — Rankin, Hill & Clark LLP

(57) ABSTRACT

A rear suspension structure includes a hub carrier having a wheel support portion by which a rear wheel is rotatably supported, the hub carrier includes a front arm portion that extends in a vehicle inner direction and toward the vehicle front side beyond an axle of the rear wheel and a rear arm portion that extends toward the vehicle rear side, the rear arm portion is coupled to a lateral beam extending in a vehicle width direction, on the vehicle rear side of the axle, a vehicle rear side end portion of a trailing arm extending in a vehicle front-rear direction is coupled to the lateral beam, and the front arm portion is coupled to a front arm attachment portion provided in the trailing arm.

5 Claims, 7 Drawing Sheets

REAR SUSPENSION STRUCTURE

BACKGROUND OF THE INVENTION

1. Field of the Invention

The present invention relates to a rear suspension structure that supports a rear wheel of a vehicle.

2. Description of the Related Art

For example, Patent Literature 1 discloses a torsion beam type rear suspension structure. In this rear suspension structure, a torsion beam is arranged on the vehicle front side of an axle of rear wheels, and both ends of the torsion beam in a longitudinal direction are coupled to paired trailing arms.

Moreover, in Patent Literature 1, each trailing arm includes a vehicle body attachment point provided in a vehicle front side end portion extending toward the vehicle front side and a wheel support point provided in a vehicle rear side end portion extending toward the vehicle rear side. It is stated that, in this torsion beam type rear suspension structure, twisting of the torsion beam allows the left and right rear wheels to be independently suspended.

PRIOR ART DOCUMENT(S)

Patent Literature(s)

Patent Literature 1: JP6218025B

SUMMARY OF THE INVENTION

In recent years, research and development for vehicle body rigidity that contributes to an increase in energy efficiency are conducted to allow more people to secure access to affordable, reliable, sustainable, advanced energy.

In the torsion beam type rear suspension structure disclosed in JP6218025B, when lateral force is generated in the rear wheels, the lateral force is transmitted to the torsion beam via the trailing arms. Consequently, in the torsion beam type rear suspension structure, the torsion beam is required to have high flexural rigidity.

However, when the torsion beam has excessively high flexural rigidity, there is a possibility that twisting of the torsion beam does not occur and the operation of independently suspending the left and right rear wheels is inhibited. Consequently, in the torsion beam type rear suspension structure, a good balance between the flexural rigidity and the torsional rigidity needs to be achieved.

The present invention has been made in view of the aforementioned points, and an object is to provide a rear suspension structure that can achieve a good balance between the flexural rigidity and the torsional rigidity.

A rear suspension structure of the present invention to achieve the above problem is a rear suspension structure configured to support a rear wheel of a vehicle, in which the vehicle includes a hub carrier having a wheel support portion by which the rear wheel is rotatably supported, the hub carrier includes a front arm portion that extends in a vehicle inner direction and toward the vehicle front side beyond an axle of the rear wheel and a rear arm portion that extends toward the vehicle rear side, the rear arm portion is coupled to a lateral beam extending in a vehicle width direction, on the vehicle rear side of the axle, a vehicle rear side end portion of a trailing arm extending in a vehicle front-rear direction is coupled to at least one of the hub carrier and the lateral beam, and the front arm portion is coupled to a front arm attachment portion provided in the trailing arm.

In the present invention, it is possible to obtain a rear suspension structure that can achieve a good balance between the flexural rigidity and the torsional rigidity. Moreover, this eventually contributes an increase in energy efficiency.

DETAILED DESCRIPTION OF THE EMBODIMENTS

Next, an embodiment of the present invention is described in detail with reference to the drawings as appropriate. Note that, in each of the drawings, "front and rear" indicate a vehicle front-rear direction, "left and right" indicate a vehicle width direction (left-right direction), and "upper and lower" indicates a vehicle upper-lower direction (vertical upper-lower direction).

Figure 1:
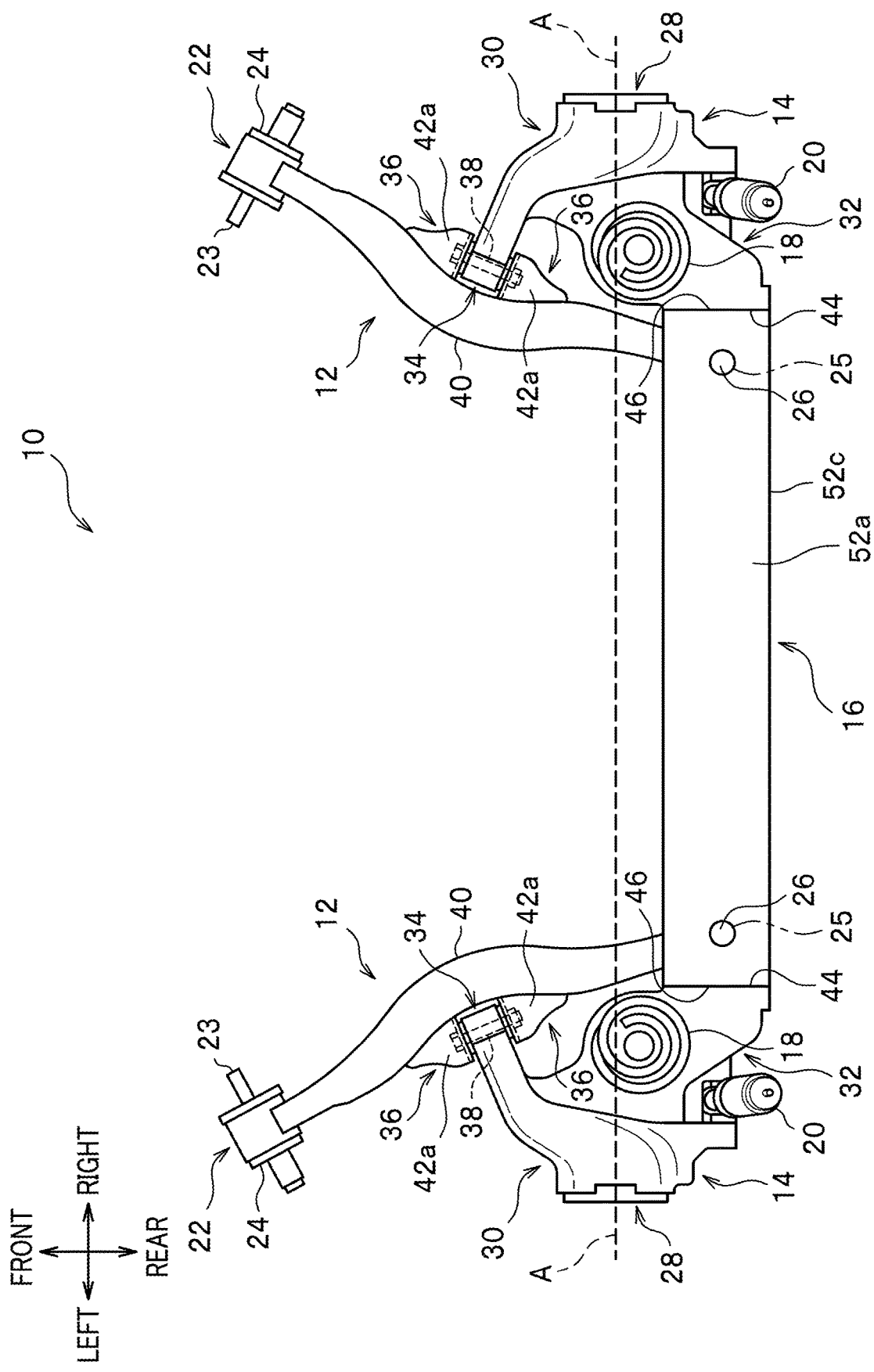
FIG. 1 is a plan view of a rear suspension to which a rear suspension structure according to an embodiment of the present invention is applied.

As shown in FIG. 1, a rear suspension structure according to the embodiment of the present invention is applied to a rear suspension 10 that supports rear wheels of a vehicle. The rear suspension 10 is configured to include paired left and right trailing arms 12, paired left and right hub carriers 14, a lateral beam 16, paired left and right coil springs 18, and dampers 20.

The trailing arms 12 are each formed of a hollow body having a closed cross section therein, and are arranged in a V-shape in which the vehicle front side is expanded toward the vehicle width direction outer side to become wider than the vehicle rear side in a plan view.

A vehicle front side end portion of each trailing arm 12 is provided with a vehicle body attachment portion 22 where the vehicle front side end portion is attached to a not-shown vehicle body side member. The vehicle body attachment portion 22 is formed of an annular body. A bush 24 including a rubber elastic body is fitted into the annular body. The bush 24 is fitted onto a pin 23 extending in the vehicle width direction. The vehicle body attachment portion 22 of the trailing arm 12 is coupled to the vehicle body side member (for example, a side sill, a rear frame, or the like) via the bush 24 and the pin 23 to be vertically swingable. Note that the bush 24 is described in detail later.

The vehicle rear side end portion 25 of each trailing arm 12 is coupled to the lateral beam 16 via a pin 26. Specifically, the rear suspension structure includes the pin 26 that vertically penetrates a through-hole provided in the vehicle rear side end portion 25 of the trailing arm 12, and the pin 26 is turnably attached to an upper wall portion 52a and a lower wall portion 52b of the lateral beam 16 that are arranged to face each other (see FIG. 2).

Figure 3:
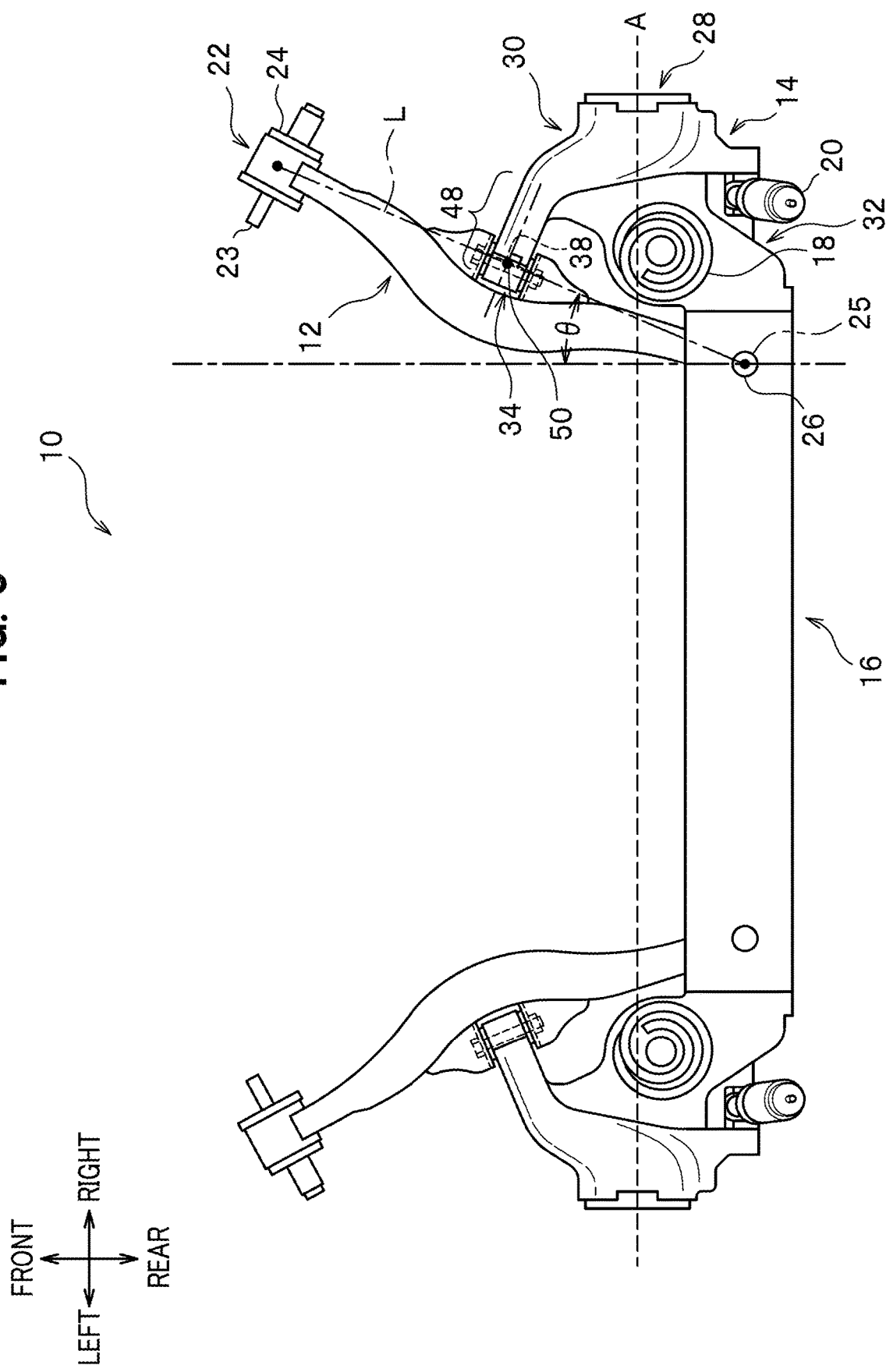
FIG. 3 is a plan view showing an imaginary line L and a tilt angle $\theta$.

As shown in FIG. 3, in the present embodiment, the vehicle front side end portion (vehicle body attachment portion 22) of each trailing arm 12 has a tilt angle θ toward the vehicle width direction outer side in an upper-lower direction view (in a plan view) such that the vehicle front side end portion is arranged on the vehicle outer side of the vehicle rear side end portion 25. In other words, the paired left and right trailing arms 12 and 12 are arranged in the substantially-V shape in the plan view.

Although the vehicle rear side end portions 25 of the trailing arms 12 are coupled to the lateral beam 16 in the present embodiment, the configuration is not limited to this and, for example, the vehicle rear side end portions 25 may be coupled to the hub carriers 14. Note that the lateral beam 16 is described in detail later.

Each of the hub carriers 14 is formed of a structural body that holds a hub (not shown) configured to support a wheel with a tire (tire and wheel) while allowing the wheel with the tire to rotate. The hub carrier 14 includes a wheel support portion 28 by which the rear tire is rotatably supported (see FIG. 1).

Moreover, as shown in FIG. 1, the hub carrier 14 is configured to be two-pronged toward the vehicle front side and the vehicle rear side. Specifically, the hub carrier 14 includes a front arm portion 30 that extends in the vehicle inner direction and toward the vehicle front side beyond an axle A of the rear wheels and a rear arm portion 32 that extends toward the vehicle rear side beyond the axle A of the rear wheels. In the present embodiment, the front arm portion 30 and the rear arm portion 32 are integrally formed. Note that the front arm portion 30 and the rear arm portion 32 may be manufactured as separate bodies, and integrally coupled to each other.

Figure 2:
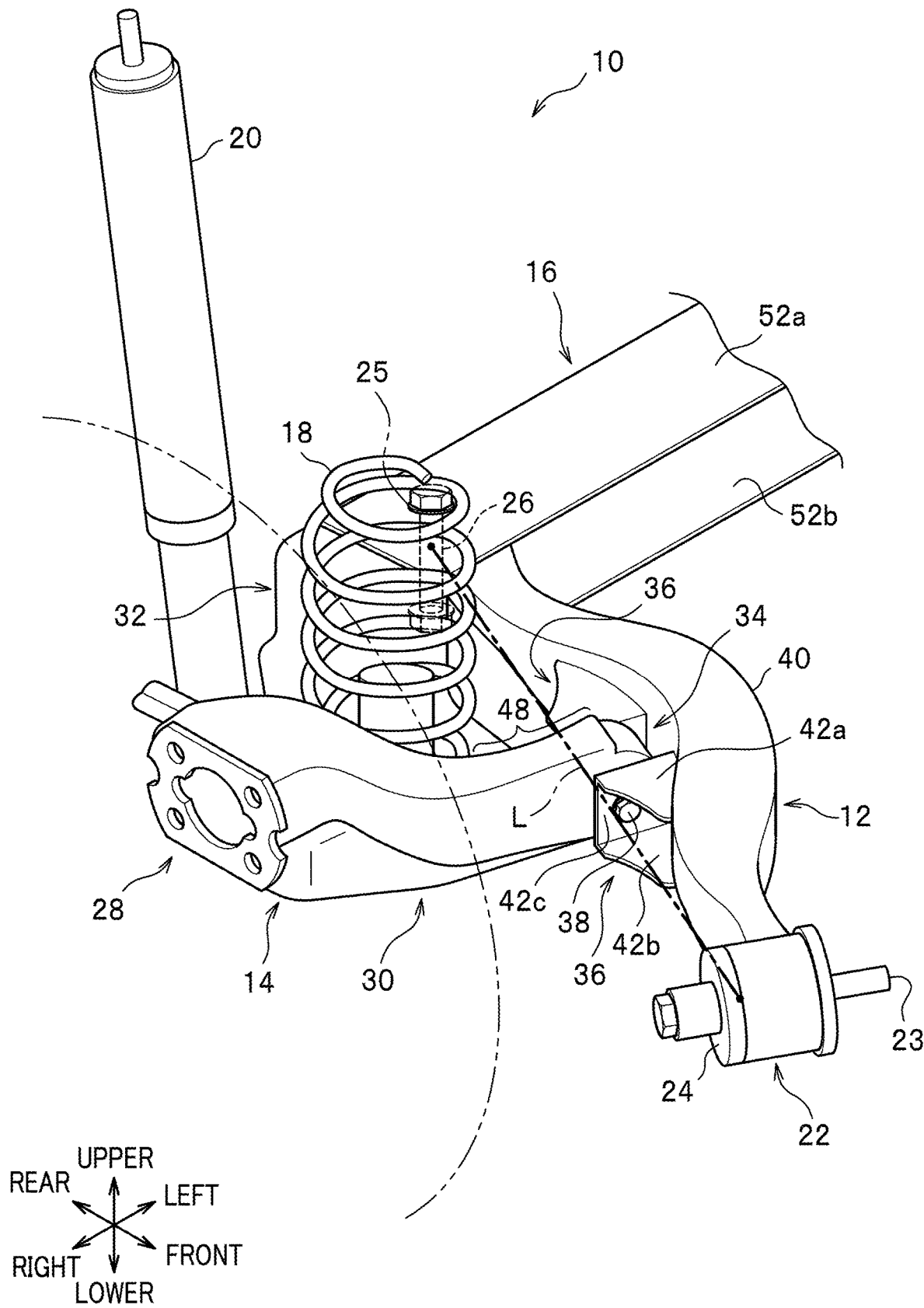
FIG. 2 is a perspective view in which the rear suspension arranged for a right rear wheel is viewed from the vehicle front side in an oblique direction.

As shown in FIGS. 1 and 2, the front arm portion 30 is coupled to the trailing arm 12 via a front arm attachment portion 34 provided in a substantially center portion of the trailing arm 12. Specifically, a vehicle front side end of the front arm portion 30 is pivotally supported via a pin 38 to be turnable, the pin 38 turnably attached to paired attachment pieces 36 and 36.

The front arm attachment portion 34 is formed of the paired attachment pieces 36 and 36 provided on the trailing arm 12 and the pin 38 turnably attached between the paired attachment pieces 36 and 36. Specifically, each trailing arm 12 includes a curved portion 40 that is bent toward the vehicle width direction inner side. The paired attachment pieces 36 and 36 arranged to face each other are provided on the vehicle width outer side of the curved portion 40.

As shown in FIG. 2, each attachment piece 36 has a substantially triangular shape in a plan view, and is configured to include an upper wall 42a and a lower wall 42b arranged to face each other in the upper-lower direction and a side wall 42c coupling an inner end portion (outer end portion) of the upper wall 42a and an inner end portion (outer end portion) of the lower wall 42b to each other. The side walls 42c of the paired attachment pieces 36 are arranged to face each other in a substantially horizontal direction, and are provided with pin supporting holes (not shown) by which the pin 38 is turnably supported.

Figure 5:
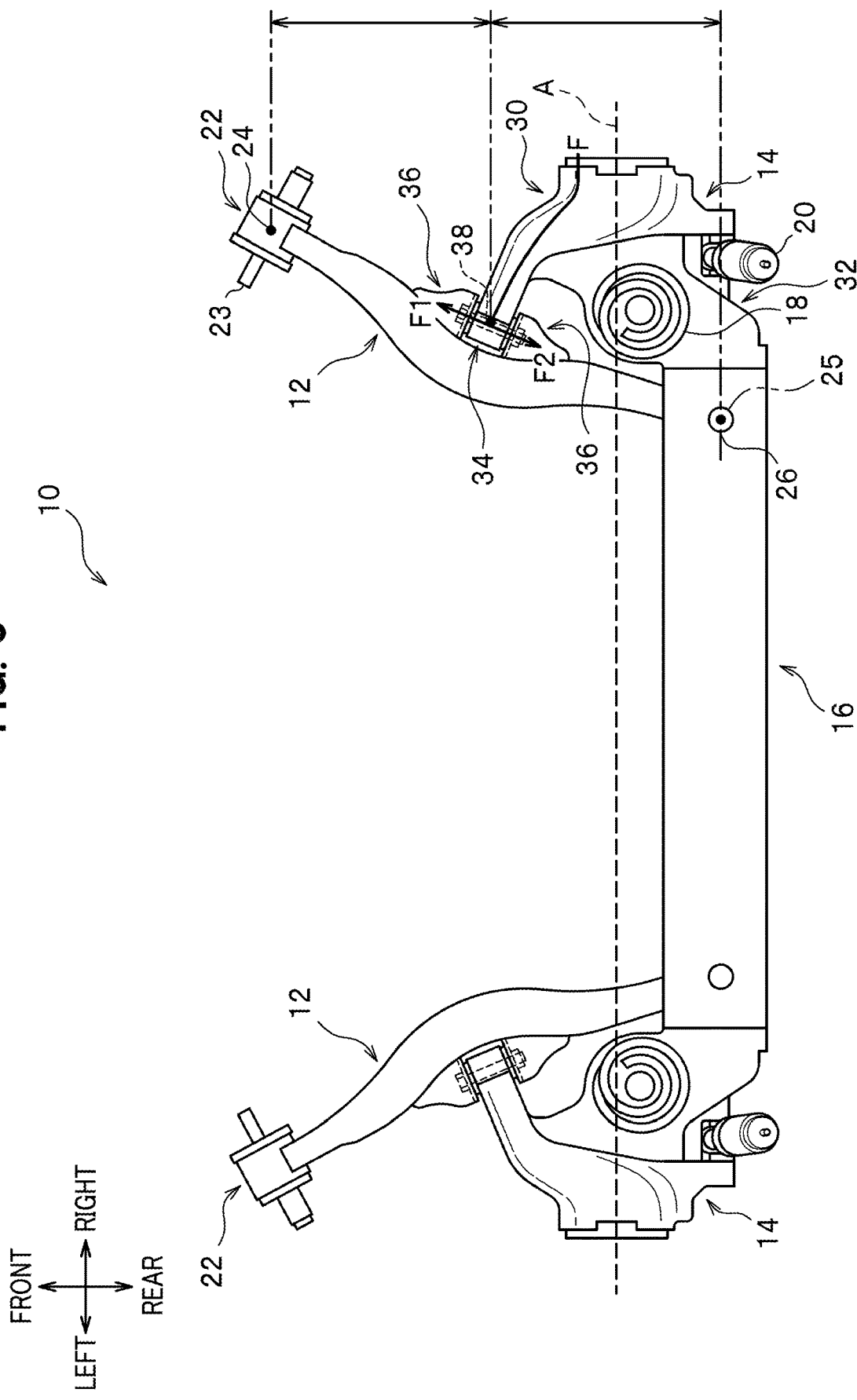
FIG. 5 is a plan view showing a state where a front arm extended portion is orthogonally attached to a front arm attachment portion of a trailing arm.

The front arm attachment portion 34 is provided at substantially the midpoint of the vehicle body attachment portion 22 and the vehicle rear side end portion 25 of the trailing arm 12 (see FIG. 5).

A vehicle width direction inner end portion 44 of the rear arm portion 32 of each hub carrier 14 is coupled (connected) to a corresponding one of vehicle width direction outer end portions 46 of the lateral beam 16 extending in the vehicle width direction.

Moreover, as shown in FIG. 3, each trailing arm 12 is arranged to have the tilt angle θ toward the vehicle width direction outer side in the upper-lower direction view such that the vehicle front side end portion (vehicle body attachment portion 22) is located on the vehicle outer side of the vehicle rear side end portion 25. The front arm portion 30 of each hub carrier 14 includes a front arm extended portion 48 that extends in a direction substantially orthogonal to the tilt angle θ in the upper-lower direction view (plan view). The front arm extended portion 48 is coupled to the front arm attachment portion 34. A coupling portion 50 (pin 38) of the front arm extended portion 48 and the front arm attachment portion 34 is arranged on an imaginary line L connecting the vehicle rear side end portion 25 and the vehicle body attachment portion 22 to each other.

The lateral beam 16 has a substantially square-U shaped cross section in a direction perpendicular to the axis, and is configured to include the upper wall portion 52a located on the upper side, the lower wall portion 52b located on the lower side, and a side wall portion 52c coupling a vehicle rear side end portion of the upper wall portion 52a and a vehicle rear side end portion of the lower wall portion 52b to each other (see FIGS. 1 and 2). An opening portion opened toward the vehicle front side is provided between a vehicle front side end portion of the upper wall portion 52a and a vehicle front side end portion of the lower wall portion 52b. The vehicle rear side end portions 25 of the respective trailing arms 12 are inserted through this opening portion.

Moreover, the pins 26 that are pivotally supported via pin support holes (not shown) provided in the upper wall portion 52a and the lower wall portion 52b are provided between the upper wall portion 52a and the lower wall portion 52b. The vehicle rear side end portions 25 of the trailing arms 12 are pivotally supported via the pins 26 to be turnable.

As shown in FIG. 1, in the present embodiment, each of the coil springs 18 and the corresponding damper 20 are not arranged coaxially, but are arranged on different axes on the vehicle rear side of the axle A. In this case, the coil spring 18 is arranged close to the axle A, on the vehicle front side, and the damper 20 is arranged at a position on the vehicle rear side of the coil spring 18. Note that the coil spring 18 and the damper 20 may be coaxially arranged such that the coil spring 18 is wound around an outer portion of the damper 20.

For example, the bush 24 is configured to include a cylindrical outer tube, an inner tube arranged in the outer tube, and a rubber elastic body provided between an inner surface of the outer tube and an outer surface of the inner tube and configured to elastically couple the outer tube and the inner tube to each other. A vibration-proofing effect is exerted based on elastic deformation of the rubber elastic body.

The rear suspension 10 according to the present embodiment is basically configured as described above, and actions and effects of the rear suspension 10 are described next.

In the present embodiment, each hub carrier 14 includes the front arm portion 30 that extends in the vehicle inner direction and toward the vehicle front side beyond the axle A of the rear wheels and the rear arm portion 32 that extends toward the vehicle rear side, and is configured to be two-pronged. The rear arm portion 32 is coupled to the vehicle width direction outer end portion of the lateral beam 16 extending in the vehicle width direction, on the vehicle rear side of the axle A. The vehicle rear side end portion 25 of the trailing arm 12 extending in the vehicle front-rear direction is coupled to the lateral beam 16 via the pin 26. The front arm portion 30 is coupled to the front arm attachment portion 34 provided in the trailing arm 12.

Figure 4:
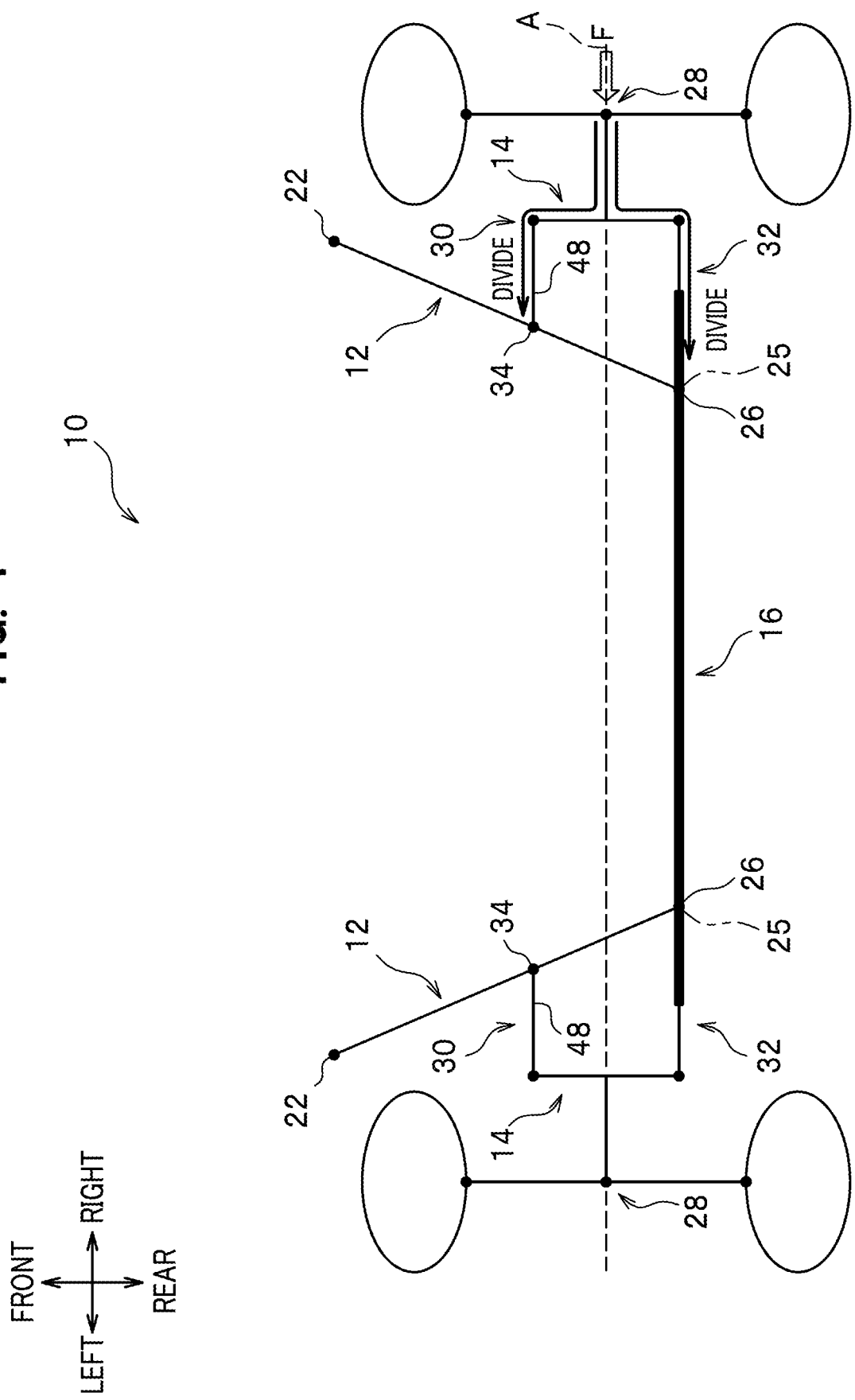
FIG. 4 is a schematic plan view of the rear suspension shown in FIG. 1.

In the present embodiment, as shown in FIG. 4, causing the hub carrier 14 by which the rear wheel is rotatably supported to have the two-prong shape allows lateral force F generated in the rear wheel to be transmitted dividedly to the lateral beam 16 coupled to the rear arm portion 32 and the trailing arm 12 coupled to the front arm portion 30.

In the present embodiment, the lateral force F generated in the rear wheel can be thereby inputted and transmitted to the vehicle body side by using the flexural rigidity of the trailing arm 12. Moreover, it is possible to eliminate a dedicated part that receives lateral input such as a panhard rod, compared to a conventional suspension type (rigid suspension) in which a lateral beam is arranged on the axle. As a result, in the present embodiment, it is possible to obtain a rear suspension structure in which a good balance between the flexural rigidity and the torsional rigidity is achieved and that can improve packaging of the rear suspension.

Moreover, since a torsion beam arranged on the vehicle front side of the axle A is unnecessary in the present embodiment, a space can be provided in an empty space (for example, an empty space below a vehicle cabin empty space or below a floor) where the torsion beam would be arranged in a conventional torsion beam type rear suspension structure. In the present embodiment, utility of a vehicle can be improved by effectively using this space.

Furthermore, in the present embodiment, the trailing arm 12 includes the vehicle body attachment portion 22 that couples the vehicle front side end portion of the trailing arm 12 to the vehicle body side member. The front arm attachment portion 34 of the trailing arm 12 is provided at substantially the midpoint of the vehicle body attachment portion 22 and the vehicle rear side end portion 25 (see FIG. 5).

In the present embodiment, the front arm portion 30 of the hub carrier 14 is coupled to an intermediate portion of the long trailing arm 12 extending along the vehicle front-rear direction, and this allows the lateral force F generated in the rear wheel to be dividedly transmitted to the vehicle front side and the vehicle rear side of the trailing arm 12 via the front arm attachment portion 34 (see F1 and F2 in FIG. 5).

Moreover, in the present embodiment, the trailing arms 12 has the tilt angle θ toward the vehicle width direction outer side in the upper-lower direction view (in the plan view) such that the vehicle front side end portion (vehicle body attachment portion 22) is on the vehicle outer side of the vehicle rear side end portion 25 (see FIG. 3).

Figure 6:
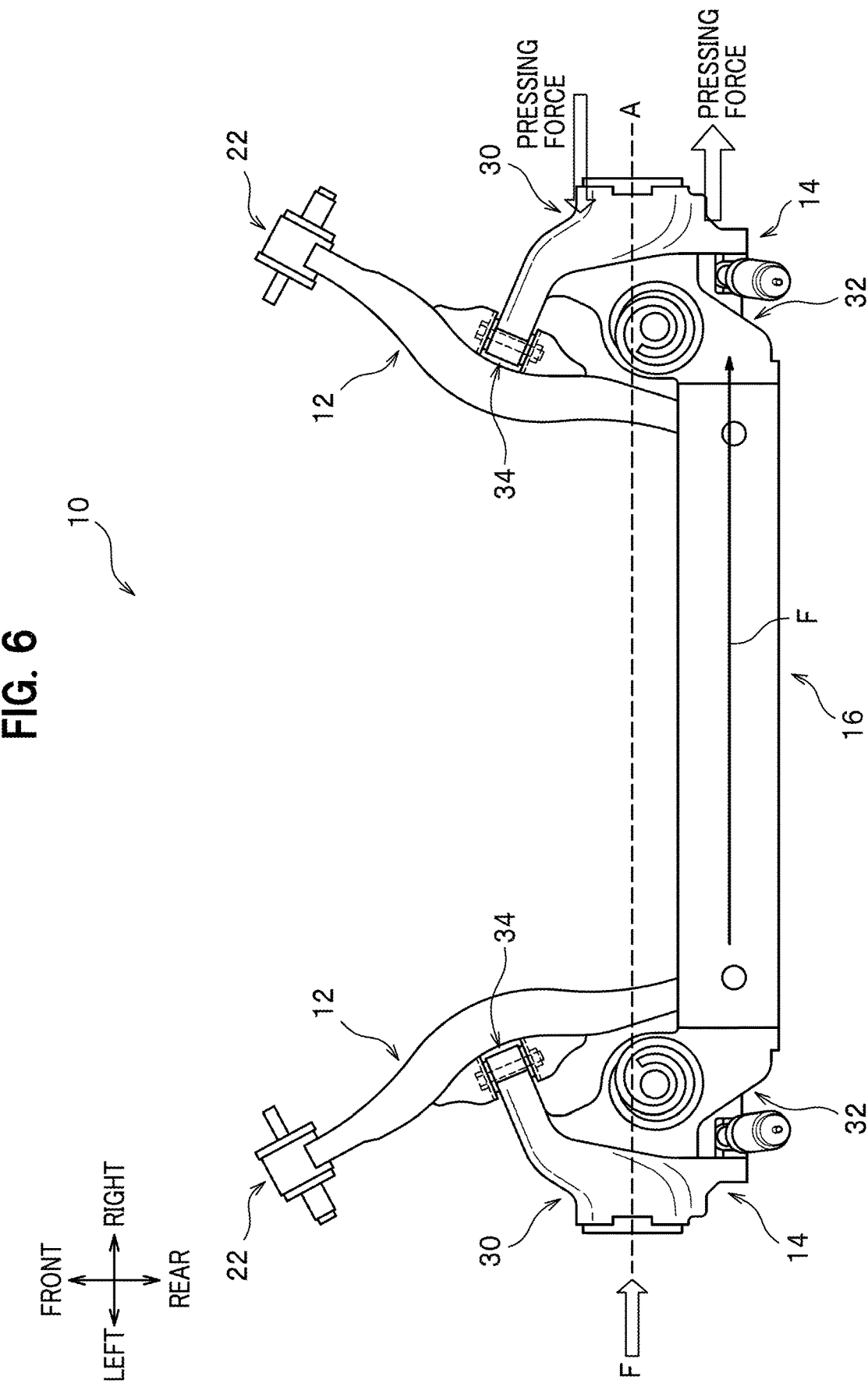
FIG. 6 is a schematic explanatory view of a characteristic in which, in input of lateral force, the lateral force acts on a hub carrier in a toe-in direction.

In the present embodiment, since the vehicle front side end portion (vehicle body attachment portion 22) of the trailing arm 12 is arranged to be tilted toward the vehicle width direction outer side (the paired left and right trailing arms 12 and 12 are arranged in the substantially-V shape in the plan view), this design can cause the rear suspension 10 to have a characteristic in which the hub carrier 14 (rear wheel) turns in a toe-in direction (rear toe-in) in input of the lateral force F, and improve the stability of the vehicle. For example, when lateral force is inputted from one rear wheel as shown in FIG. 6, the lateral force F is transmitted to the other rear wheel via the lateral beam 16. In this case, pressing force toward the vehicle width direction outer side acts on the rear arm portion 32 of the hub carrier 14, and pressing force toward the vehicle width direction inner side acts on the front arm portion 30 of the hub carrier 14 (see FIG. 6). As a result, in the present embodiment, the rear suspension 10 can be made to have the characteristic in which the hub carrier 14 (rear wheel) turns in the toe-in direction (rear toe-in) in the input of the lateral force F.

Moreover, in the present embodiment, the front arm portion 30 includes the front arm extended portion 48 that extends in the direction substantially orthogonal to the tilt angle θ in the upper-lower direction view (plan view) (see FIG. 3). The front arm extended portion 48 is attached to the front arm attachment portion 34 of the trailing arm 12.

Figure 7:
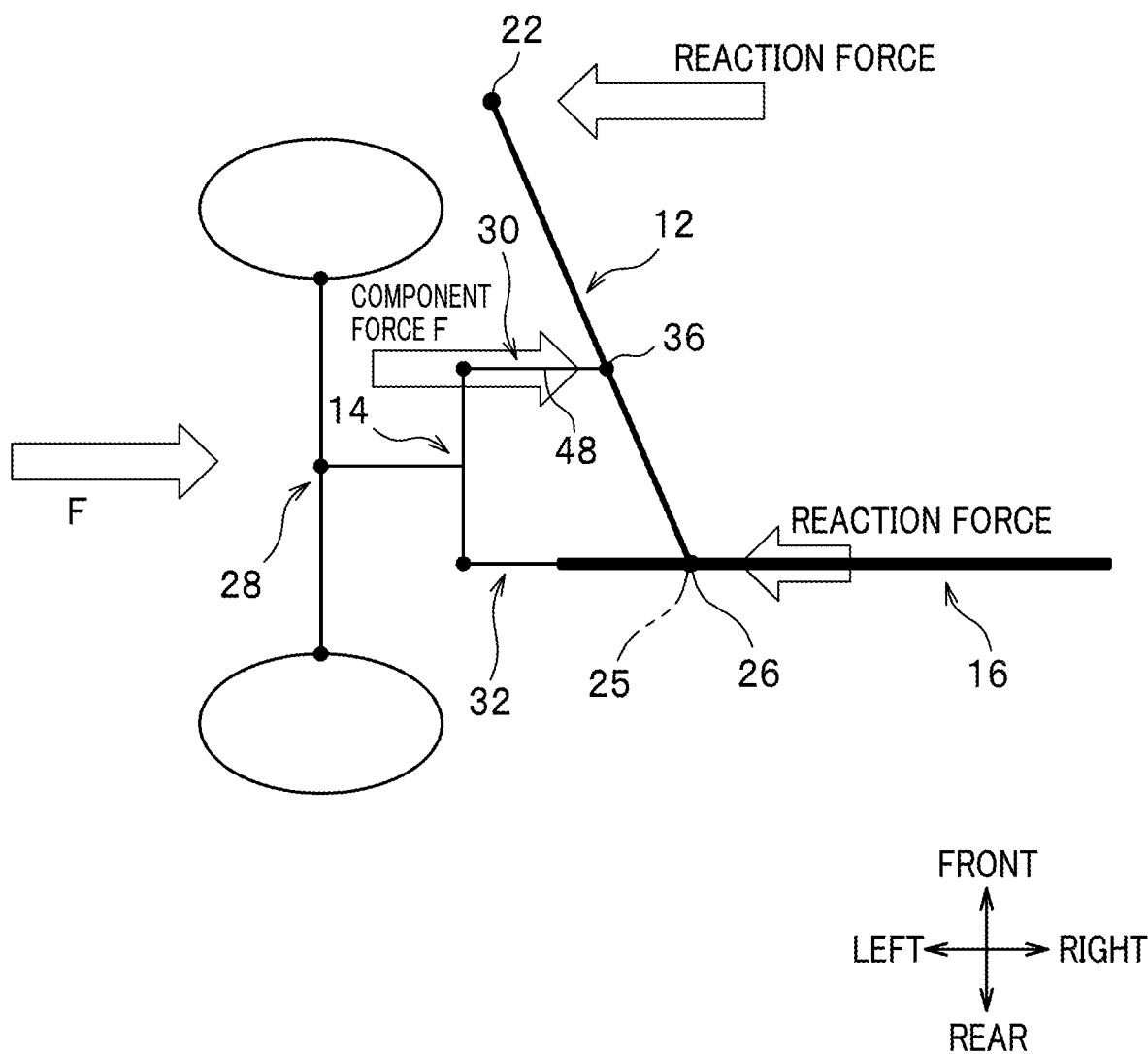
FIG. 7 is a schematic explanatory view showing a state where the lateral force is transmitted to the trailing arm in the state of FIG. 5.

In the present embodiment, since the front arm extended portion 48 of the hub carrier 14 is coupled substantially obliquely to the trailing arm 12, the lateral force generated in the rear wheel can be smoothly transmitted to the trailing arm 12 (see FIG. 7).

Furthermore, in the present embodiment, the coupling portion 50 of the front arm extended portion 48 and the front arm attachment portion 34 are arranged on the imaginary line L connecting the vehicle rear side end portion 25 and the vehicle body attachment portion 22 of the trailing arm 12 to each other (see FIG. 3).

In the present embodiment, arranging the trailing arm 12 on the imaginary line L connecting the vehicle rear side end portion 25 and the vehicle body attachment portion 22 (vehicle front side end portion) allows the load from the hub carrier 14 and the lateral beam 16 to be smoothly transmitted to the trailing arm 12. Moreover, providing the coupling portion 50 of the front arm extended portion 48 and the front arm attachment portion 34 on the imaginary line L can prevent rotation of the trailing arm 12 about the imaginary line L caused by the lateral force F generated in the rear wheel. In other words, since the coupling portion 50 of the front arm extended portion 48 and the front arm attachment portion 34 is located at the axial center of the trailing arm 12, no rotation moment is generated.

Next, a case where lateral force is received by using a panhard rod is considered.

For example, there is known a torsion beam type rear suspension structure configured to rotatably support an axle of rear wheels in which an axle beam is provided on the axle and trailing arms are coupled to both ends of the axle beam in an axial direction.

In this rear suspension structure, a panhard rod whose one end in an axial direction is fixed to the vehicle body side and whose other end is fixed to the axle beam is sometimes provided to suppress rotation force of the axle beam generated by lateral force.

However, providing the panhard rod causes problems as described below. Firstly, a structure for attaching the panhard rod to the vehicle body side is necessary. Secondly, since the panhard rod is arranged to be tilted with respect to the vehicle width direction, a suspension characteristic is left-right asymmetric, and a product performance may decrease. Thirdly, since a space for arranging the panhard rod is needs to be secured, reduction of the height of a floor panel becomes difficult.

Meanwhile, in the present embodiment, three attachment points (coupling points) are provided for each trailing arm 12. Specifically, there are provided three attachment points (coupling points) including the vehicle body attachment portion 22 provided in the vehicle front side end portion of the trailing arm 12, the vehicle rear side end portion 25 coupled to the lateral beam 16, and the front arm attachment portion 34 arranged at substantially the midpoint of the vehicle body attachment portion 22 and the vehicle rear side end portion 25. These arrangement and configuration of the three attachment points improve rigidity (component rigidity) of the trailing arm 12, and the lateral force F is eventually transmitted to the lateral beam 16 and to the vehicle body side member via the vehicle body attachment portion 22. As a result, in the present embodiment, it is possible to eliminate the panhard rod and preferably transmit the lateral force F to the vehicle body side member and the lateral beam 16.

What is claimed is:

1. A rear suspension structure configured to support a rear wheel of a vehicle, wherein
the vehicle includes a hub carrier having a wheel support portion by which the rear wheel is rotatably supported,
the hub carrier includes a front arm portion that extends in a vehicle inner direction and toward the vehicle front side beyond an axle of the rear wheel and a rear arm portion that extends toward the vehicle rear side,
the rear arm portion is coupled to a lateral beam extending in a vehicle width direction, on the vehicle rear side of the axle,
a vehicle rear side end portion of a trailing arm extending in a vehicle front-rear direction is coupled to at least one of the rear arm portion and the lateral beam on the vehicle rear side of the axle, and
the front arm portion is coupled to a front arm attachment portion provided in the trailing arm.

2. The rear suspension structure according to claim 1, wherein
the trailing arm has a vehicle body attachment portion that couples a vehicle front side end portion of the trailing arm to the vehicle, and
the front arm attachment portion is provided at substantially a midpoint of the vehicle body attachment portion and the vehicle rear side end portion.

3. The rear suspension structure according to claim 2, wherein the trailing arm is arranged to have a tilt angle toward the vehicle width direction outer side in an upper-lower direction view such that the vehicle body attachment portion is located on the vehicle outer side of the vehicle rear side end portion.

4. The rear suspension structure according to claim 3, wherein
the front arm portion has a front arm extended portion that extends in a direction substantially orthogonal to the tilt angle in the upper-lower direction view, and
the front arm extended portion is coupled to the front arm attachment portion.

5. The rear suspension structure according to claim 4, wherein a coupling portion of the front arm extended portion and the front arm attachment portion is arranged on an imaginary line connecting the vehicle rear side end portion and the vehicle body attachment portion.

* * * * *